Sept. 12, 1933. D. E. JOHNSON 1,926,725
CHUCK
Filed April 16, 1932
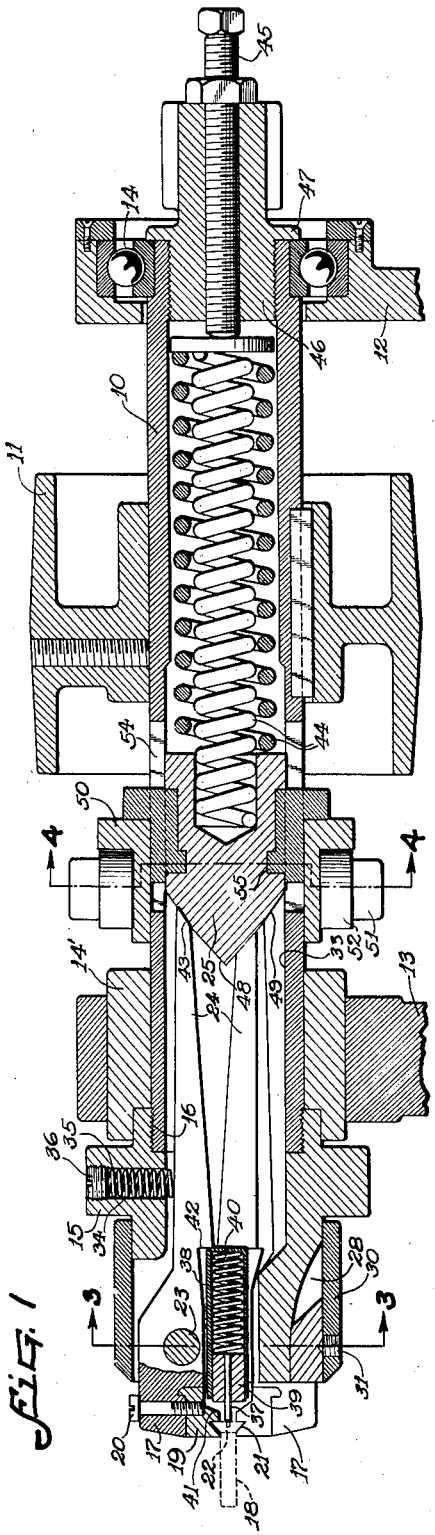
Inventor
David E. Johnson
By Chindahl, Parker & Carlson
Attorneys Patented Sept. 12, 1933

1,926,725

UNITED STATES PATENT OFFICE 1,926,725

CHUCK

David E. Johnson, Rockford, Ill.

Application April 16, 1932. Serial No. 605,626

6 Claims. (Cl. 279—108)

The invention relates generally to chucks and more particularly to work holding chucks for use in machines for making relatively small articles, such as screws, bolts or the like.

The primary object of the invention is to provide a new and improved chuck construction embodying jaws operable automatically to grip the work piece firmly without marring the same, center the same accurately and to rotate the work piece during the performance of a threading or similar operation thereon.

Another object of the invention is to provide an improved chuck wherein the jaw operating means is mounted in permanent association with a rotatable spindle with the jaw structure separately assembled and detachably associated with the spindle for actuation by the operating means whereby to simplify the adaptation of the device for different types and sizes of work.

Another object is to provide a chuck having work ejecting means supported in a simplified and improved manner.

Another object is to provide a chuck having an improved and simplified pivotal mounting for the chuck jaws.

Other objects and advantages will become apparent from the following description taken in connection with the accompanying drawing which illustrate the preferred embodiment of the invention, and in which:

Figure 1 is a longitudinal central sectional view of a chuck embodying the features of the invention.

Fig. 2 is an end elevational view of the chuck as viewed from the left in Fig. 1.

Fig. 3 is a cross sectional view taken along the line 3—3 of Fig. 1 and showing the pivotal mounting of the jaws.

Fig. 4 is a sectional view taken substantially along the line 4—4 of Fig. 1.

In the embodiment chosen for disclosure herein, a hollow spindle 10 having a drive pulley 11 thereon is rotatably supported in spaced standards 12 and 13 by bearings 14 and 15, and upon one end of the spindle 10 a head 15 is secured by means of screw threads 16, the head 15 carrying movable chuck jaws 17 for centering and clamping a work piece such as a screw 18. The head 15, being associated with the spindle 10 by means of screw threads 16, is readily removable for the purpose of repairing or replacing the jaws 17 so as to adapt the device for clamping different sizes of work, and in order to simplify this operation, the actuating means for the jaws is preferably associated with and permanently mounted on the spindle 10 and is of such a character as to permit removal of the head 15.

Preferably the head 15 carries three jaws 17 as shown in Fig. 2, the jaws being actuated in unison so as to engage and center the work piece 18. Each jaw 17 has a work engaging shoe 19 fixed thereon by a bolt 20 and providing a segmental groove 21 for engaging opposite surfaces of the head 22 of the work piece whereby to prevent axial movement of the work piece.

For the sake of simplicity, the jaws 17 are of the pivoted type, rocking about pivot pins 23 spaced from the outer ends of the jaws 17, and each jaw 17 has an operating arm 24 extending through the head 15 and into the spindle 10 for operation by a longitudinally movable cam actuator 25. The pivotal mounting of the jaws 17 is preferably arranged to facilitate removal and replacement of the jaws, and for this reason the outer end of the head 15 has three equally spaced radial slots 26 formed therein to receive the jaws 17 as shown in Figs. 1 and 3 of the drawing, and alined bores 27 are formed in opposite side walls of the slots 26 to receive the pivot pins 23. To facilitate insertion and removal of the pins 23 the portions of the head 15 intermediate the slots 26 are cut away to provide angular grooves 28 (Figs. 1 and 3) extending longitudinally of the head and of such a depth that the bores 27 open through the angular faces of the grooves.

Thus each jaw 15 is, in effect, mounted between two lugs 26ª (Fig. 3) formed as integral parts of the head 15. The pins 23 are held in place by angular pressure blocks 29 fitting in the grooves 28 between the adjacent lugs 26ª and held in position by an annular collar 30 surrounding the outer end of the head 15 and having set screws 31 therein engaging seats 32 formed in the blocks 29. Thus by loosening the set screws 31 and removing the collar 30 and the blocks 29, the ends of the pins 23 are exposed for removal of the pins.

Connected with the slots 26 and extending through the other or inner end of the head 15 is a central bore 33 alined with the bore of the spindle 10 and through which the operating arms 24 of the jaws extend into the spindle. The jaws of the present chuck are arranged to be urged toward their open positions by expansive springs 34 (only one shown), each positioned in a radial bore 35 formed in the head 15 with its outer end acting against a screw threaded plug 36 and its inner end acting on one of the arms 24.

To eject the work 18 from the jaws 17 when they are unclamped, a spring pressed ejector pin 37 is employed, mounted axially of the chuck and adapted to engage the head 22 of the work piece as shown in Fig. 1 of the drawing. The pin 37 and its actuating means are preferably mounted in the chuck so as to be supported by the jaws 17, such a mounting being provided by a cylinder 38 positioned in the central space between the jaws 17 and carrying in its open end a slidable bearing block 39 which carries the pin 37. An expansive coil spring 40 within the cylinder 38 urges the bearing block 39 and the pin 37 toward the work 18 so as to eject the same when the jaws are opened. The pin 37 projects beyond the end of the bearing block 39 and in its outward movement the bearing block engages abutments 41 formed on the shoes 19 so as to limit the outward movement of the ejector pin. Inward movement of the cylinder 38 is limited by shoulders 42 formed on the inner surface of the arms 24 of the jaws and it will be noted that the arms 24 are cut away forwardly of the shoulders 42 for a sufficient distance to allow rocking of the jaws 17.

The actuating cam 25 is preferably cone-like in form and is slidable axially within the spindle 10 into engagement with the end surfaces 43 of the arms 24 so as to spread the same and thereby clamp the jaws 17. The actuating cam 25 normally tends to clamp the jaws 17 by reason of expansive coil springs 44 mounted within the spindle 10 and acting upon the cam 25 to press the same toward the jaws 17. The pressure exerted by the springs 44 may be adjusted by means of a screw 45 threaded axially into a plug 46 which is in turn threaded into the end of the spindle 10 adjacent to the standard 12. It will be noted that the plug 46 has a flange 47 thereon engaging the inner race of the bearing 14 to clamp the same in position on the spindle 10.

The actuating cam 25 preferably has its outer end formed with a conical surface 48 of a relatively great slope so as to produce rapid clamping movement of the jaws during the first part of the operating movement of the cam. The abrupt cam surface 48 merges with a cam surface 49 of a more gradual slope so as to reduce the rate of movement of the jaws during the final portion of their clamping movement and also produce a greater multiplication of the the force exerted by the spring 44. The gradually sloping surfaces 49 of the cam block 25 remain in contact with the levers 24 when the jaws engage the work piece. The cam therefore continues to move until the work has been securely clamped regardless of irregularity in the size of the work. By thus clamping the work yieldingly, a substantially uniform clamping pressure is exerted on different work pieces and variations in the size of these work pieces are compensated for automatically.

To release the jaws 17 and permit opening thereof by the spring 24, a flanged collar 50 surrounds and is longitudinally slidable on the spindle 10, such sliding movement being obtained by a yoke 51 carrying rollers 52 engaging the flange of the collar 50. The collar 50 is operatively connected with the cam 25 by means of angular links 53 extending through longitudinal slots 54 formed in the spindle 10 and engaging notches 55 formed in the cam 25. The ends of the slots 54 serve to limit movement of the cam 25 by the springs 44 when the head and the jaws are removed.

In the use of the device it will be apparent that the head 15 may be readily removed with its associated jaws without disturbing the actuating cam 25, and that the head 15 and jaws 17 may be replaced as a whole or the jaws 17 may be readily replaced in the head 15 by reason of the conveniently removable pivot pins 23. The work engaging shoes 19 may also be changed quite readily so that the device is capable of use with many sizes and types of work. The convenient adjustment of the clamping pressure exerted on the jaws is also advantageous since it permits accurate adjustment so as to permit proper clamping of the work without marring of the finished surface thereof.

The mounting of the ejector is obviously simple and inexpensive in character and is such as to permit the ejector structure to be removed and replaced readily.

The accurate centering of the work by reason of the use of three jaws tends toward the production of more accurate work pieces and the fact that the arms 24 are engaged by the sloping surfaces 49 of the yieldingly pressed cam when the work piece 18 is clamped, also contributes to accuracy of the finished work by insuring proper clamping thereof.

I claim as my invention:

1. A chuck comprising a rotatably supported chuck body having an axial opening therethrough, a plurality of elongated jaw members extending through said opening, a plurality of lugs projecting in pairs longitudinally from said body at one end thereof, one of said jaws being positioned between the lugs of each pair, alined bores extending through each pair of lugs and the associated jaw, pivot pins extending through said bores, blocks adapted to close the ends of said bores to hold said pins in position, and means for holding said blocks in place.

2. A chuck comprising a rotatably supported chuck body having an axial opening therethrough, a plurality of elongated jaw members extending through said opening, a plurality of lugs projecting in pairs longitudinally from said body at one end thereof, one of said jaw members being positioned between the lugs of each pair, alined bores extending through each pair of lugs and the associated jaw member, pivot pins extending through said bores, pressure blocks adapted to engage the ends of said pins, a collar surrounding all of said lugs and said blocks, and set screws in said collar for engaging said blocks to clamp the same in position.

3. A chuck comprising a rotatably supported chuck body having a plurality of pairs of lugs projecting from one end thereof parallel to the axis of rotation thereof, a plurality of members extending one between each of said pairs of lugs, an alined bore extending transversely through each pair of lugs and the associated member, pivot pins extending through said bores to pivotally support each member, a collar encircling said lugs, and means acting between said collar and the ends of said pins to maintain the pins in position.

4. In a chuck of the character described, the combination of a collar, a plurality of elongated jaws extending into said collar longitudinally of the axis thereof and equidistantly spaced around said axis a plurality of pivot pins each extending transversely through one of said jaws within said collar, and a plurality of clamping means arranged to be tightened from a point exteriorly of said collar and acting between the collar and said pins to maintain the latter rigid with said collar.

5. In a chuck of the character described, the combination of a collar, a plurality of elongated jaws extending into said collar longitudinally of the axis thereof and equidistantly spaced around said axis, a plurality of pivot pins each extending transversely through one of said jaws within said collar, and a plurality of clamping means for maintaining said pins rigidly positioned in said collar and each acting between the collar and the ends of two of said pins.

6. A chuck comprising, in combination, a plurality of elongated substantially parallel jaws arranged in equidistant annularly spaced relation, a plurality of pivot pins each extending transversely of one of said jaws intermediate the ends of the latter, a plurality of annularly arranged spacer members for positioning said jaws relative to said pins while permitting pivoting thereof above said pins, a collar adapted to receive said jaws and said spacers in an endwise direction, and a plurality of clamping means adjustable from a point exteriorly of said collar and acting between the collar and the ends of said pins to maintain the jaw and spacer assembly rigid with said collar.

DAVID E. JOHNSON.